United States Patent
Nitzpon et al.

(10) Patent No.: US 7,809,477 B2
(45) Date of Patent: *Oct. 5, 2010

(54) METHOD FOR STARTING UP A WIND ENERGY PLANT AFTER AN OPERATION STOPPAGE AND WIND ENERGY PLANT WHICH CAN EXECUTE THE METHOD

(75) Inventors: Joachim Nitzpon, Hamburg (DE); Hauke Karstens, Hamburg (DE); Ulrich Harms, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 3 days.

This patent is subject to a terminal disclaimer.

(21) Appl. No.: 11/867,773

(22) Filed: Oct. 5, 2007

(65) Prior Publication Data

US 2009/0001723 A1    Jan. 1, 2009

(30) Foreign Application Priority Data

Jun. 30, 2007    (DE) .................. 10 2007 030 494

(51) Int. Cl.
  G05D 23/00   (2006.01)
  F03D 9/00    (2006.01)
  H02P 9/04    (2006.01)

(52) U.S. Cl. ............... 700/299; 700/287; 700/290; 416/169 R; 416/170 R; 290/44

(58) Field of Classification Search ............... 700/275, 700/286–287, 290, 299; 415/905; 416/169 R, 416/170 R; 290/44
See application file for complete search history.

(56) References Cited

U.S. PATENT DOCUMENTS 4,297,075 A * 10/1981 Jacobs et al. ............... 416/14
4,329,117 A *  5/1982 Doman ................. 416/170 R
4,464,579 A    8/1984 Schwarz
6,766,643 B2 *  7/2004 Christensen ................ 60/398
7,081,689 B2 *  7/2006 Tilscher et al. ............. 290/44
7,161,260 B2 *  1/2007 Kruger-Gotzmann et al. . 290/55
7,179,056 B2 *  2/2007 Siegfriedsen ........... 416/170 R (Continued)

FOREIGN PATENT DOCUMENTS

EP    1 091 152 A1    9/2000

(Continued)

OTHER PUBLICATIONS

"Wind Energy: Cold Weather Issues", by Antoine Lacroix, Dr. James F. Manwell, U of Mass at Amherst, Renewable Energy Research Laboratory, Jun. 2000, pp. 1-17.

Primary Examiner—Ramesh B Patel
(74) Attorney, Agent, or Firm—Vidas, Arrett & Steinkraus, P.A.

(57) ABSTRACT

A method for starting up a wind energy plant after an operation stoppage, wherein the wind energy plant has a gearbox in the drive train and an operation management which can control at least one operational variable significant for the strain of the gearbox B of the wind energy plant to a desired value $B_{Soll}$, wherein after the operation stoppage, the desired value $B_{Soll}$ is limited by a maximum value $B_{Max}$, which is preset depending on a measured temperature of a gearbox component and/or of a lubricant for the gearbox.

25 Claims, 2 Drawing Sheets

U.S. PATENT DOCUMENTS

| | | | | |
|---|---|---|---|---|
| 7,494,193 B2 * | 2/2009 | Wedekind | ............... | 303/2 |
| 7,498,683 B2 * | 3/2009 | Landwehr | ............... | 290/43 |
| 2003/0145587 A1 * | 8/2003 | Christensen | ............... | 60/398 |
| 2004/0151578 A1 * | 8/2004 | Wobben | ............... | 415/4.1 |
| 2005/0143957 A1 * | 6/2005 | Kauppila et al. | ............... | 702/187 |
| 2005/0194787 A1 * | 9/2005 | Tilscher et al. | ............... | 290/8 |
| 2005/0284225 A1 * | 12/2005 | Luo | ............... | 73/593 |
| 2006/0140761 A1 * | 6/2006 | LeMieux | ............... | 416/61 |
| 2006/0214428 A1 * | 9/2006 | Altemark et al. | ............... | 290/44 |
| 2006/0260312 A1 * | 11/2006 | Ingersoll | ............... | 60/641.1 |
| 2007/0007769 A1 * | 1/2007 | Basteck | ............... | 290/1 C |
| 2007/0015617 A1 * | 1/2007 | Bertolotti et al. | ............... | 474/85 |
| 2008/0078228 A1 * | 4/2008 | Nies | ............... | 73/1.01 |
| 2008/0164091 A1 * | 7/2008 | Kerber | ............... | 181/211 |
| 2008/0164698 A1 * | 7/2008 | Habets | ............... | 290/44 |
| 2008/0252076 A1 * | 10/2008 | Fortmann et al. | ............... | 290/44 |
| 2008/0265846 A1 * | 10/2008 | Laubrock et al. | ............... | 322/29 |
| 2008/0292467 A1 * | 11/2008 | Borgen | ............... | 416/244 R |
| 2009/0058094 A1 * | 3/2009 | Jansen et al. | ............... | 290/55 |

FOREIGN PATENT DOCUMENTS

EP      1 393 960 A2     8/2003

\* cited by examiner

METHOD FOR STARTING UP A WIND ENERGY PLANT AFTER AN OPERATION STOPPAGE AND WIND ENERGY PLANT WHICH CAN EXECUTE THE METHOD

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for starting up a wind energy plant after an operation stoppage, and a wind energy plant which can execute the method.

Wind energy plants have a drive train for the transmission of the torque of a rotor of the wind energy plant driven by the wind to a generator which provides electric energy. In the most frequent construction, the generator is operated at a rotational speed which is substantially higher than that of the rotor, so that a step-down gearbox is needed in the drive train. Such gearboxes are normally realised with two or three steps and have a number of gearings in engagement with each other. All the components of such a drive train are exposed to high mechanical strains, the gearings of the gearbox in particular are strongly strained by the high torques of the rotor. As a consequence, in spite of the intense efforts of the manufacturers of wind energy plants and gearboxes, respectively, damages in the drive train region occur always again, which can lead to the breakdown of the wind energy plant. The high strains lead also to a limited lifetime of individual drive train components, which can make a replacement of the components necessary, as the case may be. Such a replacement is accompanied by a high expense of money and time and leads to an unwanted failure of the wind energy plant.

Based on this, it is the objective of the present invention to indicate a method which permits a particularly gentle operation of the drive train components of a wind energy plant and which promotes a long lifetime of the drive train components, as well as a wind energy plant which can execute the method.

BRIEF SUMMARY OF THE INVENTION

The method of the present invention serves for starting up a wind energy plant after the operation stoppage, wherein the wind energy plant has a gearbox in the drive train and an operation management which can control at least one operational variable B significant for the strain of the gearbox to a desired value $B_S$, wherein after an operation stoppage, the desired value $B_S$ is limited by a maximum value $B_{Max}$, which is preset depending on a measured temperature T of a gearbox component and/or of a lubricant for the gearbox.

The operation stoppage can be caused through a stand-still or a spinning operation of the wind energy plant due to low wind velocities, maintenance works, a cut-off of the wind energy plant due to an external command or due to another deviation from the normal grid supply operation of the wind energy plant. With starting up the wind energy plant, the transition from such an operation stoppage to the regular grid supply operation is meant, up to the maximum possible power, as the case may be.

The operational variable B significant for the strain of the gearbox may be any arbitrary operational variable of the wind energy plant, which has a substantial influence on the strain of the gearbox.

The present invention is based on the finding that the obtainable lifetime of the drive train components can be prolonged through a gentle start-up of the wind energy plant in particular. The reason for this is that the drive train components are often only insufficiently lubricated after an operation stoppage, as long as the lubricant for the gearbox has not reached a certain operation temperature. In this period of time, the drive train components are subject to an increased wear. This is the case for arbitrary drive train components which need sufficient lubrication, for instance for the gearbox, individual gearbox steps, individual gearwheels or bearings. At low oil temperatures, the gearbox itself is also cooled down. When the wind energy plant is started up again in this state and high torques or powers are to be transmitted, individual components of the gearbox or individual gearbox assembly parts can warm up at different speeds. Through this, tensions and strains between the components may occur, which can result in a higher wear.

The desired value $B_S$ to which the operation management of the wind energy plant controls the operational variable B significant for the strain of the gearbox may be preset by the operation management itself on the basis of the prevailing wind speed or externally, by a wind park control for instance.

During the start-up of the wind energy plant after the operation stoppage, the desired value $B_S$ receives an upper limit through a maximum value $B_{Max}$. The presetting of the maximum value $B_{Max}$ takes place depending on a measured temperature T of a lubricant for the gearbox and/or on a measured Temperature T of a gearbox component.

This procedure results in a limitation of the mechanical strain of the drive train components, which is adapted to the actually present lubricating capability of the lubricant or the warm-up condition of the monitored gearbox component. The strains actually acting on the drive train components are limited by this, such that they do not lead to excessive wear at the given lubricating efficiency. Through this, the obtainable lifespan of the drive train components is prolonged.

The dependence of the maximum value $B_{Max}$ from the operational variable T can be stored via a functional relation in the wind energy plant, preferably in the operation management thereof, or in the form of a look-up table, which assigns one maximum value $B_{Max}$ to each temperature.

The measurement of the temperature of the lubricant for the gearbox may take place on arbitrary locations. For instance, the temperature of the lubricant can be selectively measured at the location of certain wearing parts, like near to a certain bearing, for instance. Plural temperature sensors may be used also.

In one embodiment, the operational variable B significant for the strain of the gearbox is the electric power generated by the wind energy plant. The electric power can be a matter of an effective power, a reactive power or an apparent power, for instance. The control to the desired value $B_S$ through the operation management can take place in a known way by presetting a generator moment or a corresponding blade pitch adjustment. The electric power generated by the wind energy plant is directly linked to the strain of the gearbox.

In one embodiment, the operational variable B significant for the strain of the gearbox is a torque in the drive train of the wind energy plant. Even this operational variable is immediately linked to the strain of the gearbox. The torque can be established or measured for any arbitrary component of the drive train. Preferably, measurement takes place on the driven shaft of the gearbox. The control of this torque to a desired value $B_S$ can take place by presetting a corresponding generator moment in particular.

Preferably, the temperature T of the lubricant is measured in an oil pan or an oil line of the gearbox. For instance, the oil line can be an oil supply or an oil sucking line and be connected to an oil pan. In such gearboxes with an oil pan, the oil for the lubrication of the gearbox can be supplied by moving gearbox parts, which dip into the oil pan, or by a purposeful conveyance and distribution of the oil from the oil pan to the components of the gearbox to be lubricated, with the aid of an oil pump, e.g. Through the central measurement of the temperature in the oil line or the oil pan, a temperature is taken as the basis for the method which can be measured particularly simply and which represents the lubricating capability of the oil for all gearbox parts supplied via the oil line or from the oil pan, respectively.

In a further embodiment of the method, the starting up is ended when the measured temperature T corresponds to a certain operation temperature. Thus, no more limitation of the operational variable B is preset when the gearbox or the lubricant, respectively, has reached the desired operation temperature. By doing so, the strain limitation is confined to the necessary extent.

In a further embodiment of the method, the maximum value $B_{Max}$ is increased after an operation stoppage, until it reaches a rated value $B_N$ of the wind energy plant at a certain temperature $T_2$. Through this, even the strain of the drive train components is increased with increasing efficiency of the lubricant. With the rated value $B_N$ it may be matter of a rated power or a rated torque in particular. Preferably, the maximum value $B_{Max}$ is steadily increased after an operation stoppage.

In a further embodiment of the method, the maximum value $B_{Max}$ has an initial value $B_F$ when the wind energy plant is started up. Thus, there is no limitation of the desired value $B_S$ to values below the minimum value preset by the initial value $B_F$. As a consequence, a minimum strain of the drive train components corresponding to this initial value $B_F$ is permitted, irrespective of the temperature of the lubricant or of the gearbox component, respectively. Through this, an excessive limitation of the operational variable B is avoided.

According to a further embodiment, the maximum value $B_{Max}$ is kept constant up to a presettable temperature $T_1$ after starting up the wind energy plant. Thus, in a period of time up to reaching the temperature $T_1$, no increase of the upper limit significant for the strain of the gearbox is performed. By doing so, it is ascertained that the strain of the drive trains components is increased only when the lubricant has reached a certain minimum lubricating capability as a consequence of the temperature $T_1$.

In a further embodiment, the maximum value $B_{Max}$ is preset to be proportional to the temperature T in a period. Thus, there is a linear increase of the maximum value $B_{Max}$ depending on the temperature T. This corresponds to a uniform, continuous reduction of the strain limitation with increasing temperature T. A uniform increase of the permissible strain of the drive train components is achieved by doing so.

According to a further embodiment, the maximum value $B_{Max}$ is preset to be proportional to the temperature between the temperatures $T_1$ and $T_2$. Thus, the period of uniform strain limitation reduction fills in the whole time interval between the temperatures $T_1$ and $T_2$.

In a further embodiment, the wind energy plant is started up only when a minimum value $B_{min}$ of the operational variable B significant for the strain of the gearbox is to be expected. On its part, the minimum value $B_{Min}$ can be preset to depend on the temperature. However, it may also have a fixed value, which is independent of the temperature. The value $B_{Min}$ can be selected such that the strains of the drive train components occurring at this value of the operational variable B result in a reliable joint rotation of all the bearing components at the given lubricating capability of the lubricants. Otherwise, at small strains an increased wear of bearing components not already working reliably at these strains may occur. Thus, this realisation contributes also to an increased life of the drive train components.

In a further embodiment, it is not fallen below a minimum value $B_{Min}$ of the operational variable B significant for the strain of the gearbox when the wind energy plant is started up. When the operational variable B significant for the strain of the gearbox falls down to a value below the minimum value $B_{Min}$, the start-up can be stopped. For instance, in the case of decreasing wind velocities after the beginning of the start-up, it is ascertained by stopping the start-up that no increased wear due to stuck bearing elements occurs.

The wind energy plant of the present invention has a gearbox in the drive train, at least one temperature sensor for measuring a temperature T of a gearbox component and/or of a lubricant for the gearbox and an operation management, which can control at least one operational variable B of the wind energy plant significant for the strain of the gearbox to a desired value $B_S$, wherein the operation management has an equipment for establishing a maximum value $B_{Max}$ depending on a temperature T established by the at least one temperature sensor, and wherein the operation management can preset the maximum value $B_{Max}$ for the limitation of the desired value $B_S$.

The wind energy plant of the present invention is particularly suited for the execution of the method of the present invention.

In the equipment for establishing a maximum value $B_{Max}$ it may be matter of suitable programs or program components which are executed for the operation of the wind energy plant on a control computer.

The present invention will be explained by means of an example of its realisation depicted in a figure in the following. In the example of realisation, the operational variable B significant for the strain of the gearbox is the electric power provided by the gearbox, which is designated with P as usual.

BRIEF DESCRIPTION OF THE DRAWING OF THE INVENTION

DETAILED DESCRIPTION OF THE INVENTION

Figure 1:
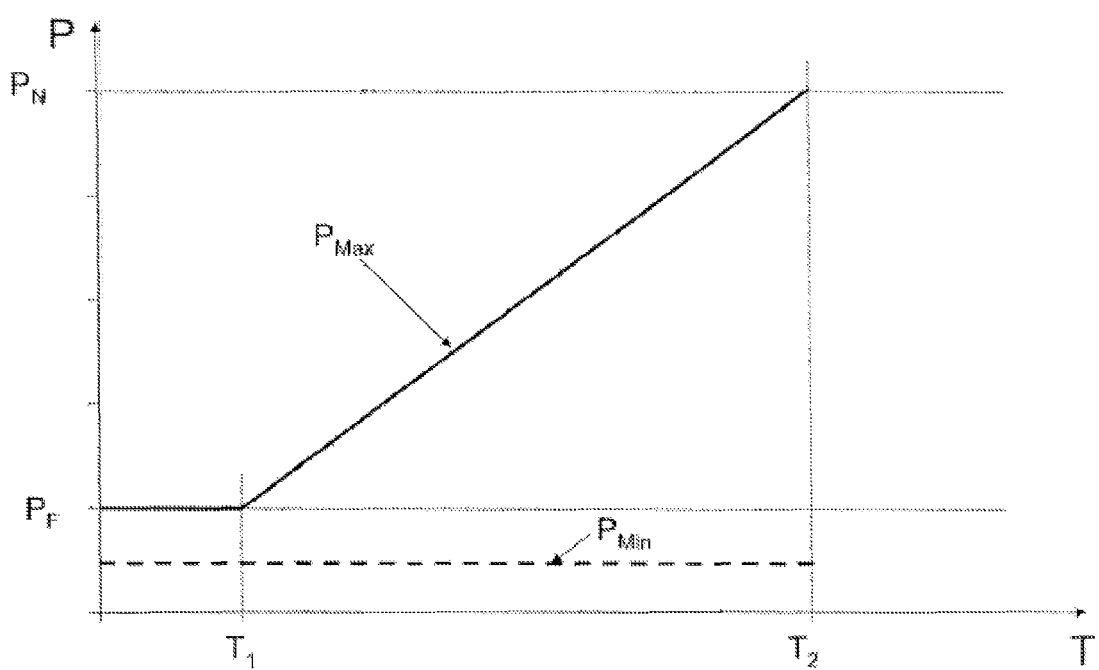
FIG. 1 shows a diagram concerning the dependence of the maximum value $P_{Max}$ of the power from the temperature T of a lubricant for the gearbox.

While this invention may be embodied in many different forms, there are described in detail herein a specific preferred embodiment of the invention. This description is an exemplification of the principles of the invention and is not intended to limit the invention to the particular embodiment illustrated On the abscissa of the coordinate system shown in FIG. 1, the temperature of a lubricant for the gearbox of a wind energy plant is plotted. In the example, the temperature is based on a measured value, which is measured with a suitable temperature transmitter in an oil pan of the gearbox. On the ordinate of the coordinate system, the electric power P provided by the wind energy plant is indicated. On the basis of the relation depicted in the diagram, one maximum value of the power $B_{Max}$ is assigned to each temperature T, which is used for the limitation of the desired value $P_S$ of the power. Further, a minimum value $P_{Min}$ of the power is drawn in, which represents a lower limit for the power not depending from temperature.

The curve for the maximum value $B_{Max}$ begins at a minimum temperature on the left edge of the diagram at an initial value $P_F$, which amounts to about ⅕ of the also drawn in rated power $P_N$ of the wind energy plant in the example. Irrespective of the temperature of the lubricant, the desired value of the power $P_S$ is not limited to values below this always permitted power $P_F$. The maximum value $B_{Max}$ is kept constant on the value $P_F$, until a first temperature $T_1$ is reached. Above the temperature $T_1$, there is an increase of the maximum value $B_{Max}$ proportional to the temperature, until the maximum value $B_{Max}$ reaches the rated value $P_N$ of the power of the wind energy plant at the second temperature $T_2$. At this point of time, the start-up of the wind energy plant is completed and there is no more further limitation of the electric power by the maximum value $B_{Max}$.

The minimum value $P_{Min}$ of the power which is drawn in has a constant value which amounts to about 50 percent of the power $P_F$. During the start-up of the wind energy plant it is monitored whether the actually provided power P exceeds the minimum value $P_{Min}$. When this is not the case, the start-up is stopped and the wind energy plant is cut off. Correspondingly, the start-up procedure is started only when exceeding the minimum power $P_{Min}$ can be expected due to the prevailing operation conditions, the wind velocity in particular.

The power values necessary for the execution of the method are established through a measurement or calculation of the provided electric power. In doing so, a continuous measurement can be performed and an average value of the provided electric power P can be generated in consecutive time intervals of 30 seconds duration, which can be taken as the basis for the further operation management.

Figure 2:
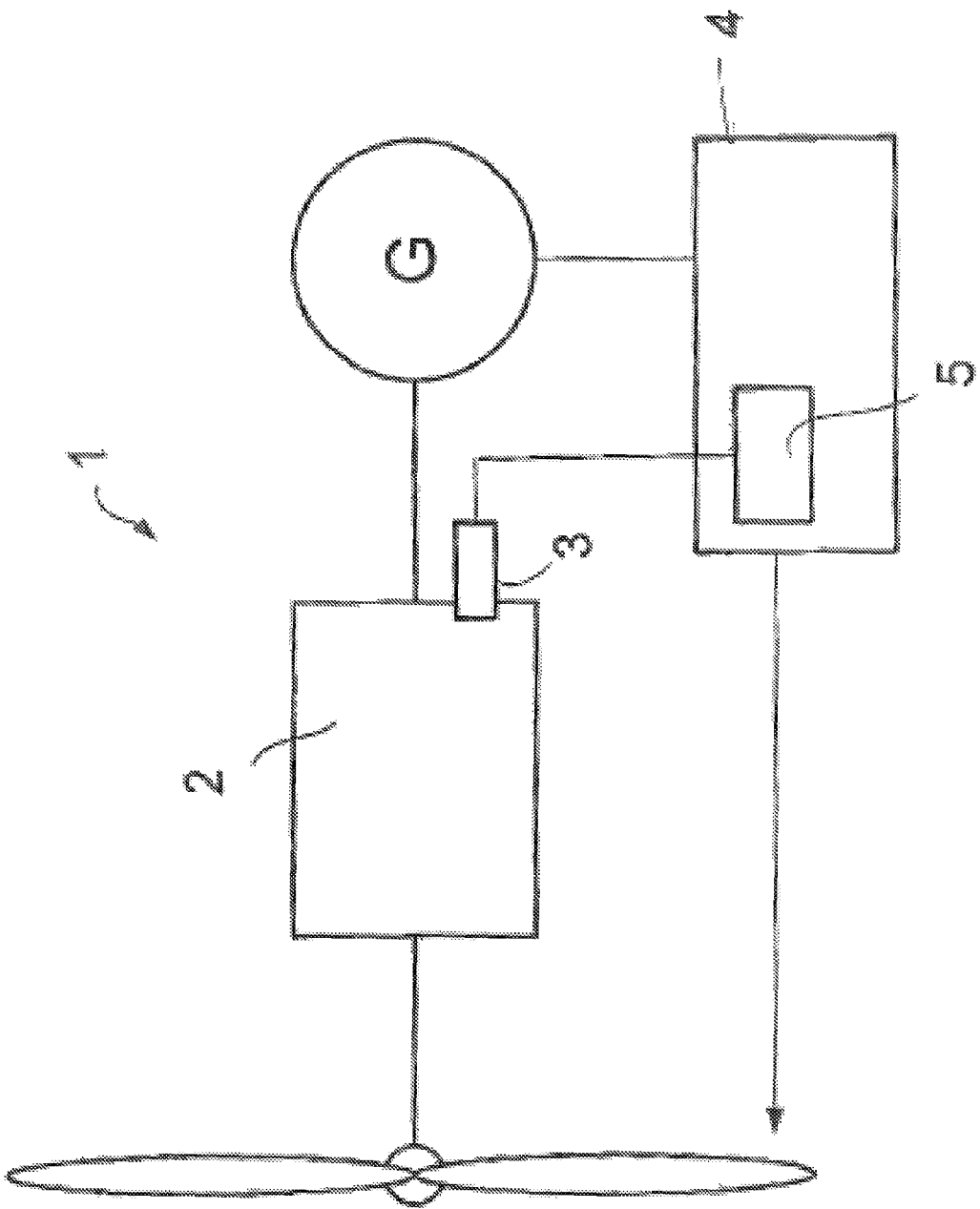
FIG. 2 is a block diagram of the inventive wind energy plant.

FIG. 2 is a schematic drawing which shows the wind energy plant (1), the gear box (2), the temperature sensor (3), the operation management (4), equipment for establishing a maximum value for the operational variable $B_{max}$ (5) and the generator G.

As used herein, it should be understood that B refers to any operational variable which is significant for the strain of the gear box, while P refers to the specific operational variable based on electrical power. Therefore it should be understood that $B_N$ and $P_N$ refer to the nominal or rated value of the operational variable. $P_F$ refers to the initial value of the operational variable and $B_S$ refers to the desired value of the operational variable.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for starting up a wind energy plant after an operation stoppage, comprising the steps of:
   providing a wind energy plant having a gearbox in the drive train and an operation management which can control at least one operational variable B significant for the strain of the gearbox of the wind energy plant to a desired value $B_S$,
   limiting the desired value $B_S$ by a maximum value $B_{Max}$, which is preset depending on a measured temperature of a gearbox component or of a lubricant for the gearbox.

2. A method according to claim 1, characterised in that one of the operational variables B significant for the strain of the gearbox is the electric power generated by the wind energy plant.

3. A method according to claim 1, characterised in that one of the operational variables B significant for the strain of the gearbox is a torque in the drive train of the wind energy plant.

4. A method according to claim 1, characterised in that the temperature T of the lubricant in an oil pan or an oil line of the gearbox is measured.

5. A method according to claim 1, characterised in that the start-up is ended when the measured temperature T corresponds to a certain operation temperature.

6. A method according to claim 1, characterised in that the maximum value $B_{Max}$ is increased after an operation stoppage, until it reaches a rated value $B_N$ of the wind energy plant at a certain temperature $T_2$.

7. A method according to claim 1, characterised in that the maximum value $B_{Max}$ has an initial value $B_F$ when the wind energy plant is started up.

8. A method according to claim 1, characterised in that the maximum value $B_{Max}$ is kept constant up to a presettable temperature $T_1$ after starting up the wind energy plant.

9. A method according to claim 1, characterised in that the maximum value $B_{Max}$ is preset to be proportional to the temperature T in a period.

10. A method according to claim 9, characterised in that the maximum value $B_{Max}$ is preset to be proportional to the temperature T between the temperatures $T_1$ and $T_2$.

11. A method according to claim 1, characterised in that the wind energy plant is started up only when a minimum value $B_{min}$ of the operational variable B significant for the strain of the gearbox is to be expected.

12. A method according to claim 1, characterised in that it is not fallen below a minimum value $B_{min}$ of the operational variable B significant for the strain of the gearbox when the wind energy plant is started up.

13. A wind energy plant with a gearbox in the drive train, at least one temperature sensor for measuring a temperature T of a gearbox component or of a lubricant for the gearbox and an operation management, which can control at least one operational variable B of the wind energy plant significant for the strain of the gearbox to a desired value $B_S$, wherein the operation management has an equipment for establishing a maximum value $B_{Max}$ depending on a temperature T established by the at least one temperature sensor, and wherein the operation management can preset the maximum value $B_{Max}$ for the limitation of the desired value $B_S$.

14. A wind energy plant according to claim 13, characterised in that one of the operational variables B significant for the strain of the gearbox is the electric power generated by the wind energy plant.

15. A wind energy plant according to claim 13, characterised in that one of the operational variables B significant for the strain of the gearbox is a torque in the drive train of the wind energy plant.

16. A wind energy plant according to claim 13, characterised in that the at least one temperature sensor is arranged in an oil pan or an oil line of the gearbox.

17. A wind energy plant according to claim 13, characterised in that the operation management can end the start-up when the measured temperature T corresponds to a certain operation temperature.

18. A wind energy plant according to claim 13, characterised in that the equipment for establishing the maximum value $B_{Max}$ can increase the maximum value $B_{Max}$ after an operation stoppage, until it reaches a rated value $B_N$ of the wind energy plant at a certain temperature $T_2$.

19. A wind energy plant according to claim 13, characterised in that the equipment for establishing a maximum value $B_{Max}$ can preset an initial value $B_F$ when the wind energy plant is started up.

20. A wind energy plant according to claim 13, characterised in that the equipment for establishing a maximum value $B_{Max}$ can keep the maximum value $B_{Max}$ constant up to a presettable temperature $T_1$ after starting up the wind energy plant.

21. A wind energy plant according to claim 13, characterised in that the equipment for establishing a maximum value $B_{Max}$ can preset the maximum value $B_{Max}$ to be proportional to the temperature T in a period.

22. A wind energy plant according to claim 21, characterised in that the equipment for establishing a maximum value $B_{Max}$ can preset the maximum value $B_{Max}$ to be proportional to the temperature T between the temperatures $T_1$ and $T_2$.

23. A wind energy plant according to claim 13, characterised in that the operation management can start up the wind energy plant selectively only when a minimum value $B_{min}$ of the operational variable B significant for the strain of the gearbox is achievable.

24. A wind energy plant according to claim 13, characterised in that the operation management can control the wind energy plant when starting up such that it is not fallen below a minimum value $B_{min}$ of the operational variable B significant for the strain of the gearbox.

25. The wind energy plant of claim 13 wherein the maximum value $B_{Max}$ is preset depending on both the measured temperature of the gearbox component and of the lubricant for the gearbox.

* * * * *